Aug. 3, 1965  H. A. BOHM  3,198,065
LIGHT REGULATING MEANS FOR PROJECTORS
Filed Nov. 21, 1960  2 Sheets-Sheet 1
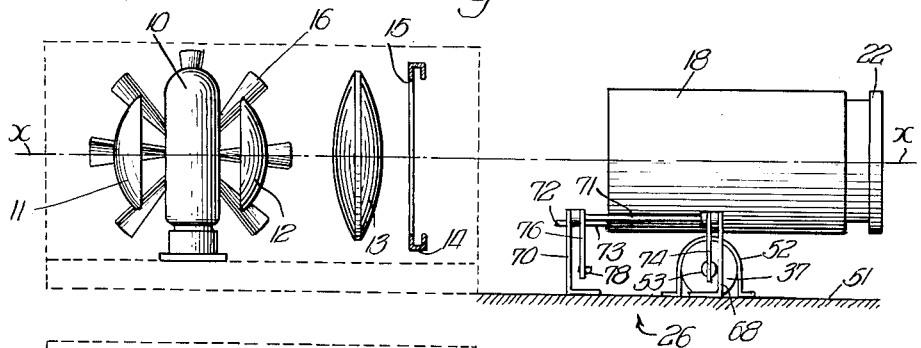
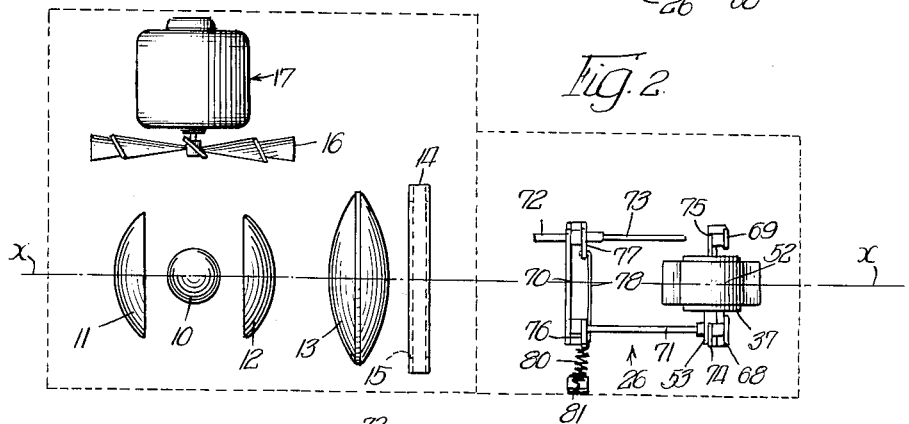
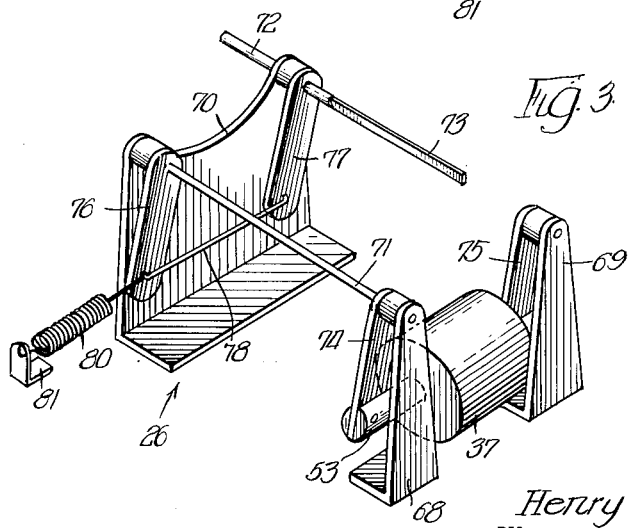
INVENTOR.
Henry A. Bohm,
BY
Cromwell, Greist & Warden
Attys Aug. 3, 1965    H. A. BOHM    3,198,065
LIGHT REGULATING MEANS FOR PROJECTORS
Filed Nov. 21, 1960    2 Sheets-Sheet 2
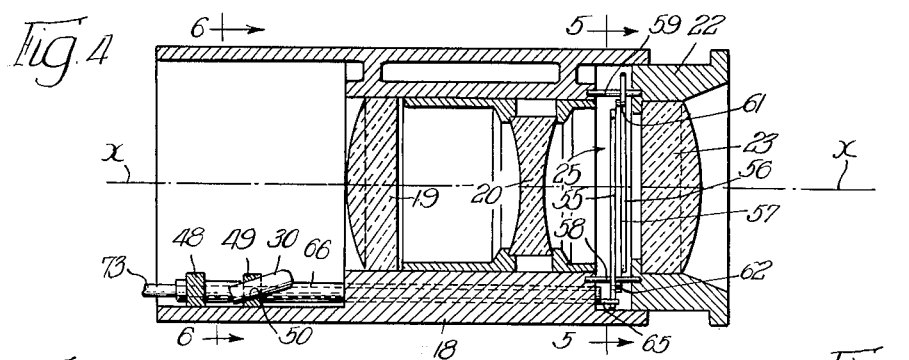
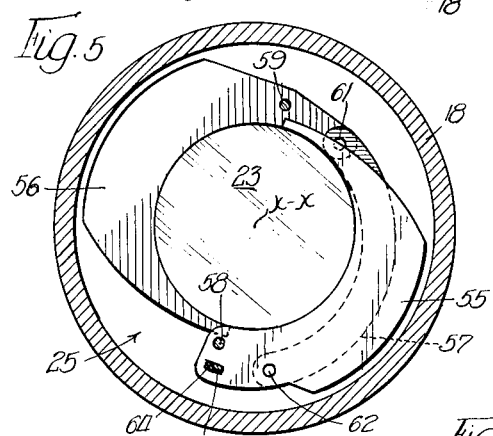
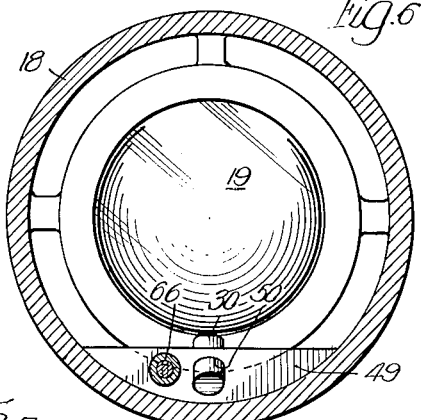
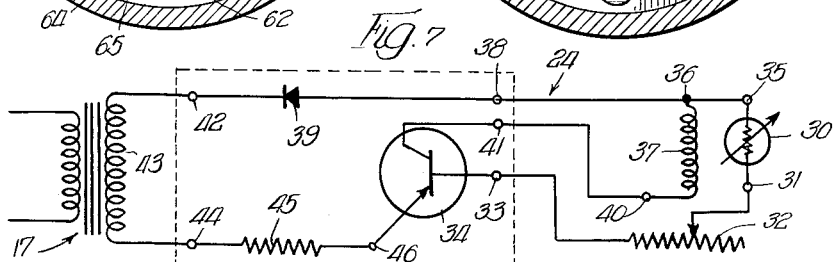
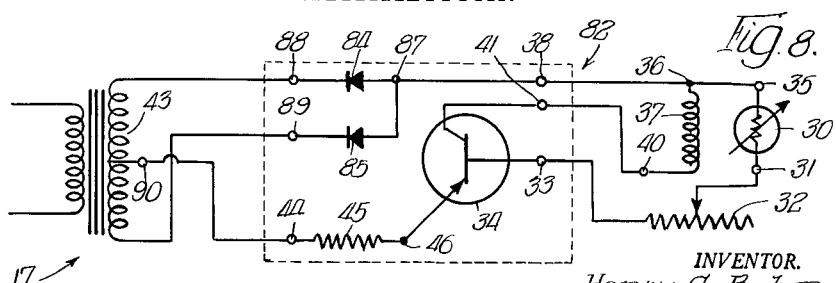
INVENTOR.
Henry A. Bohm,
BY
Cromwell, Greist & Warden
Attys.

United States Patent Office 3,198,065
Patented Aug. 3, 1965

3,198,065
LIGHT REGULATING MEANS FOR PROJECTORS
Henry A. Bohm, 981 Elm Ridge Drive, Glencoe, Ill.
Filed Nov. 21, 1960, Ser. No. 70,537
3 Claims. (Cl. 88—24)

The present invention relates to projectors and, more particularly, to means for controlling the projector power whereby to permit improved projection of transparencies of varying densities.

It is most difficult for photographers, particularly amateurs, when taking a series of still pictures for slide reproduction or when taking movies to control their lighting sufficiently accurately to achieve slides or film strips of a uniform density. Even perfectly exposed transparencies may vary in density, for instance, transparencies of a light object against a light background and a dark object against a dark background. Thus, when such slides or film strips are projected on a screen by means of the usual projector, the less dense transparencies or portions of a film strip will appear extremely bright on the screen with the more dense transparencies or portions of a film strip appearing unusually dim. Such variations in a series of images projected in rapid succession on the screen are distracting and discomforting to viewers and may result in eye strain.

It is therefore, an important object of the invention to provide a new and novel projector control which results in substantially improved viewer eye comfort by automatically reducing the projector power when transparencies of less density than a normal reference transparency are being projected and by automatically increasing the projector power when transparencies of greater density than the normal reference transparency are being projected.

Another important object of the invention is to provide a new and novel projector control of the character described including means for sensing variations in the density of different transparencies being projected, adjustable means for controlling the amount of light transmitted to the screen, and means responsive to the density variations sensed by the first mentioned means for automatically adjusting the light control means.

A more detailed object of the invention is to provide a new and novel projector control of the character described including a photo-electric cell circuit for sensing variations in the average intensity of the light beam transmitted through a series of transparencies, an iris diaphragm for increasing and decreasing the cross-sectional area of the light beam, and a linkage mechanism operably connected between a movable armature of a solenoid coil in the photo-electric cell circuit and the iris diaphragm, whereby to automatically increase or decrease the cross-sectional area of the light beam transmitted to the screen in accordance with variations in the density of the series of transparencies.

Further objects of the invention are to provide a new and novel projector control of the character described which is economical to manufacture and simple to assemble in projectors, which is extremely sensitive, which requires little or no maintenance, and which serves to substantially eliminate viewer eye strain normally resulting from wide variations in the light intensity on the screen due to variations in density of the transparencies being projected.

Certain other objects of the invention will, in part, be obvious, and will in part appear hereinafter.

For a more complete understanding of the nature and scope of the invention reference may now be had to the accompanying drawings wherein:

FIG. 1 is a partially diagrammatic side elevational view of a slide projector incorporating a preferred embodiment of the control means of the present invention;

FIG. 2 is a top plan view of the projector of FIG. 1 with the lens housing removed;

FIG. 3 is a perspective view of the linkage system of the control means;

FIG. 4 is an enlarged longitudinal vertical section taken through the lens housing of the control means;

FIG. 5 is an enlarged vertical section taken generally on the line 5—5 of FIG. 4 with the iris diaphragm in its maximum open position;

FIG. 6 is an enlarged vertical section taken generally on the line 6—6 of FIG. 4;

FIG. 7 is a schematic diagram of one form of a sensing circuit for the control means; and FIG. 8 is a schematic diagram of a modified form of sensing circuit for the control means.

The basic elements of a conventional projector, such as the projector disclosed in Pechkranz Patent No. 2,401,506, dated June 4, 1946, for projecting images of transparent slides on a screen are illustrated in FIGS. 1 and 2. This projector has an optical axis indicated by a broken line $x$—$x$. As is well known in the art, these basic slide projector elements include a lamp 10 which provides the source of illumination, a reflector 11, lens elements 12 and 13, a slide holding plate member 14 having a generally square slide viewing aperture 15 formed therein, a cooling fan blade member 16 suitably driven by a motor 17, and a lens housing 18 which may be adjustable toward and away from the slide holder 14 in order to permit focusing of the projected image. As is best shown in FIG. 4, the cylindrical lens housing 18 has a pair of lens elements 19 and 20 supported therein in a suitable manner and is provided at its forward end with a front mount or cap member 22 which in turn supports a lens element 23. Transparent slides to be projected may be inserted in the slide holder 14 either manually or by any of the automatic slide changing devices well known in the art. The projector could also be provided with suitable mechanism for projecting film strips. The elements described thus far herein are well known to be basic in the projector art and are to be found in most projectors. Although not illustrated in the drawings because it comprises no part of the present invention, suitable supporting and housing structure would be provided for these elements.

The present invention is primarily concerned with a projector control which serves to permit a projector incorporating the same to project a number of transparencies (differing from each other in density values) in a manner whereby a substantially uniform degree of brightness between successive transparencies is maintained. Such a projector control has been found to be very benficial inasmuch as photographers, particularly amateurs, find it very difficult to control their lighting sufficiently accurately to achieve slides or film strips of a uniform density. Even transparencies which are perfectly exposed may vary in density. For instance, a perfectly exposed transparentcy of a light object against a light background will vary substantially in density from a perfectly exposed transparency of a dark object against a dark background. Thus, when such slides or film strips are projected by means of the usual projector, the less dense transparencies appear extremely bright on the screen with the more dense transparencies appearing unusually dim. These variations in the projected images of a series of transparencies shown in rapid sequence on the screen are discomforting to viewers and may result in eye strain.

Briefly, the control device of the invention includes an electrical circuit 24 (FIG. 7) including a photo-elecrtic cell for sensing variations in the density of different transparencies being projected, an aperture size control assembly or iris diaphragm 25 (FIG. 4) for varying the size of the opening or aperture in the housing 18 and thereby the cross-sectional area of the light beam whereby to control the amount of light transmitted to a screen, and a linkage system 26 (FIG. 3) and which is operably connected to the iris diaphragm 25, which linkage system includes a solenoid connected in the electrical circuit, whereby to automatically increase the size of the opening in the lens housing 18 when a transparency denser than normal is being projected and to automatically decrease the size of the opening in the lens housing 18 when a transparency less dense than normal is being projected.

A suitable electrical sensing circuit 24 is illustrated in FIG. 7. This circuit includes a photo-electric cell 30 having one terminal 31 connected through a variable resistance 32 to one terminal 33 of a transistor 34 and its other terminal 35 connected both to one terminal 36 of a solenoid coil 37 and to one terminal 38 of a diode rectifier 39. The other terminal 40 of the solenoid coil 37 is connected to a second terminal 41 of the transistor 34 and the other terminal 42 of the diode rectifier 39 is connected to one end of the secondary coil 43 of the fan motor 17. The other end of the secondary coil 43 is connected to one terminal 44 of a resistance 45 which is connected in series relation with a third terminal 46 of the transistor 34. Inasmuch as the power for the circuit 24 is derived from the secondary coil 43 of the fan motor 17, this may be described as a low voltage circuit.

As is best illustrated in FIGS. 4 and 6, the photo-electric cell 30 is disposed in the lower rear end portion of the lens housing 18 and is directed slightly upwardly toward the rearmost lens element 19 therein. A pair of supporting members 48 and 49 having the shape of chordal segments are secured in the lower rear end portion of the lens housing 18 and the photoelectric cell 30 is mounted in an upwardly inclined bore 50 formed in the member 49.

As is best illustrated in FIGS. 1, 2 and 3, the solenoid coil 37 is supported on a portion of the chassis 51 of the projector and is fixedly held thereagainst by a coil clamp 52. The solenoid coil 37 is provided with a central opening through which extends a movable armature or core 53. For proper magnetic coupling, one end of the armature 53 is formed of brass or other non-magnetic material while the other end is formed of cold rolled steel or other magnetic material.

The photo-electric cell 30 is positioned so as to sense the light reflected from the rearwardmost lens element 19 when a transparentcy is being projected even though the lens element 19 may be coated to minimize such reflection. When a transparency less dense than a normal transparency is being projected, more reflected light will be sensed by the photo-electric cell 30 whereby to increase the current flow through the photo-electric cell circuit above the normal current flow therethrough. When a transparency denser than a normal transparency is being projected, less reflected light will be sensed by the photoelectric cell 30 whereby to decrease the current flow through the photo-electric cell circuit below the normal current flow therethrough. These current flow variations through the photo-electric cell 30 are magnified through the solenoid coil 37 by the transistor 34 by a factor which may be as large as 40 whereby to develop sufficient power to cause movement of the solenoid armature 53 in either of two opposite directions from its normal position. The direction of movement of the solenoid armature 53 will be determined by whether the current flow variation through the photo-electric cell 30 is an increase or a decrease over the normal current flow therethrough and the extent of the movement of the solenoid armature 53 will be determined by the magnitude of the current flow variation. The movement of the solenoid armature 53 is transmitted to the iris diaphragm 25 in the lens housing 18 by the linkage system 26, which system will be described in detail hereinafter.

The iris diaphragm 25 for increasing and decreasing the size of the opening or aperture in the lens housing 18 thereby controlling the cross-sectional area of the transmitted light beam whereby to control the light intensity on a screen is best illustrated in FIGS. 4 and 5. Although a greater number of leaf members may be utilized, the iris diaphragm 25 in the embodiment of the invention illustrated in the drawings comprises a pair of generally crescent-shaped leaf members 55 and 56 and a connecting link 57. The rearmost leaf member 55 is pivotally mounted at its lower end on a pin 58 which is supported in the lower portion of the lens housing 18 which extends parallel to the optical axis $x$—$x$. The forwardmost leaf member 56 is pivotally mounted at its upper end on a pin 59 which is supported in the upper portion of the lens housing 18 and which extends parallel to the optical axis $x$—$x$. The connecting link 57, which is disposed between the leaf members 55 and 56, is pivotally connected at its upper end to the upper end portion of the leaf member 56 by a pin 61 and pivotally connected at its lower end to the lower end portion of the leaf member 55 by a pin 62 whereby pivoting movement of either one of the leaf members 55 and 56 results in simultaneous pivoting movement of the other leaf member. The two leaf members 55 and 56 are so mounted and interconnected that they are simultaneously pivotable either toward the optical axis $x$—$x$ whereby to decrease the normal size of the opening or aperture in the lens housing 18 or away from the optical axis $x$—$x$ whereby to increase the normal size of the opening or aperture in the lens housing 18. In FIG. 5, the leaf members 55 and 56 are shown in their outermost positions whereby the cross-sectional area of the light beam transmitted through the lens housing 18 is at its maximum.

Provision is made for pivoting the leaf member 55 about the pin 58 with the leaf member 56 being simultaneously pivoted therewith as a result of the connection therebetween by the link member 57. The lower end portion of the leaf member 55 is provided with a generally rectangular opening 64 (FIG. 5) which is adapted to receive therethrough a generally rectangular tongue 65 which projects forwardly from the front end of a cylindrical tube member 66 which extends longitudinally of the lens housing 18 and is rotatably supported in a series of aligned bores formed in the lower portion of the lens housing 18 and in the supporting members 48 and 49. The forwardly projecting tongue 65 of the rotatable tube member 66 is offset eccentrically relative to the axis of rotation thereof whereby rotation or rocking movement of the tube member 66 serves to pivot the leaf member 55 about its mounting pin 58. The rear end of the rotatable tube member 66 is provided with a rectangular opening (not shown) for driving engagement with a portion of the linkage system 26 to be described.

As best illustrated in FIG. 3, the linkage system 26 includes a pair of upright support members 68 and 69 which are disposed at opposite ends of the solenoid coil 37 and a third upright support member 70 which is spaced therefrom. A rotatably supported rock shaft 71 extends between the upper end of the support member 68 and the adjacent upper corner of the support member 70. A horizontally disposed rock shaft 72 is rotatably supported in the other upper corner of the support member 70 and is provided forwardly of the support member 70 with a portion 73 which is rectangular in cross-section and which is adapted to extend into the tube member 66 for driving engagement in the rectangular opening formed in the rear end thereof. This telescopic or spline-like driving arrangement permits focusing movement of the lens housing 18 toward and away from the slide holder 14. A pair of levers 74 and 75 are pivotally supported from the upper ends of the support members 68 and 69, respectively, with the lever 74 being secured to the rock shaft 71. The lower ends of the levers 74 and 75 are received in the slots formed in the opposite ends of the solenoid armature 53 and are pivotally connected thereto whereby any movement of the armature 53 relative to the solenoid coil 37 results in pivoting movement of the levers 74 and 75 and rocking of the rock shaft 71. A lever 76 is secured to the opposite end of the rock shaft 71 and a lever 77 is secured to the rock shaft 72. The lower ends of the levers 76 and 77 are interconnected by a connecting element 78 whereby any pivoting movement of the lever 76 as a result of rocking movement of the rock shaft 71 is transmitted the lever through the connecting element 78. As the lever member 77 is secured to the rock shaft 72, any pivoting movement thereof results in rocking movement of the shaft 72. Thus, rocking movement of the rock shaft 72 in response to movement of the solenoid armature 53, which movement results from the photo-electric cell 30 sensing variations in the density of different transparencies being projected, is transmitted to the leaf member 55 of the iris diaphragm 25 through the rotatable tube member 66 whereby to increase or decrease the cross-sectional area of the light beam transmitted through the lens housing 18 and thereby to increase or decrease the projecting power of the projector. The term projecting power as used herein means the intensity or brightness of the projected light beam. This intensity or brightness is a function of the cross sectional area of the light beam which is controlled by opening or closing the diaphragm.

A light spring member 80 which is connected between a fixed bracket 81 and the lower end of the lever 76 provides a mechanical bias for the linkage system 26 in such a way that the iris diaphragm 25 is resiliently urged toward its maximum open position.

When the circuit 24 is actuated, as when the power cord of the projector is plugged into an electrical outlet, with a transparency of normal density supported in the slide holder 14, the normal current flow through the photo-electric cell 30, which is of the resistive type, will be such that the leaf members 55 and 56 of the iris diaphragm 25 will be positioned intermediate their innermost and outermost positions whereby the amount of light transmitted to the screen will be of a desirable value for viewer eye comfort. Thus, the projecting power used when projecting transparencies of normal density is less than the maximum projecting power of the projector. This normal current flow through the photo-electric cell 30 may be varied to increase or decrease the projecting power of the projector and thus the amount of light transmitted to the screen by adjusting the variable resistance 32 in the sensing circuit 24 by means of a manually operable control knob (not shown) which is located externally of the projector casing. The variable resistance 32, which may be described as a sensitivity control, may also be adjusted to compensate for variations in line voltage and for aging of the illuminating lamp 10.

In operation, when a transparency which is more dense than a reference transparency of normal density is being projected, the photo-electric cell 30 will sense the decrease in the light reflected from the lens element 19 with a resulting decrease in the flow of current through the photo-electric cell 30 below the normal established current flow therethrough. The armature 53 of the solenoid coil 37 will then be shifted in a direction such that the linkage system 26 will pivot the leaf members 55 and 56 of the iris diaphragm 25, through its driving connection with the tubular member 66, outwardly away from the optical axis x—x of the projector whereby to increase the cross-sectional area of the light beam transmitted through the lens housing 18 and accordingly increase the projecting power of the projector during projection of the transparency which is denser than the reference transparency. When a transparency which is less dense than the reference transparency of normal density is being projected, the photo-electric cell 30 will sense the increase in the light reflected from the lens element 19 with a resulting increase in the flow of current through the photo-electric cell 30 above the normal established current flow therethrough. The armature 53 of the solenoid coil 37 will then be shifted in the opposite direction such that the linkage system 26, acting through the rotatable tubular member 66, will pivot the leaf members 55 and 56 of the iris diaphragm inwardly toward the optical axis x—x of the projector whereby to decrease the cross-sectional area of the light beam transmitted through the lens housing 18 and accordingly decrease the projecting power of the projector during projection of the transparency which is less dense than the reference transparency. During the periods when no transparency is positioned in the projector for projection, the leaf members 55 and 56 of the iris diaphragm 25 will be pivoted into their minimum aperture positions whereby to reduce to a minimum the light intensity on the screen when no transparency is being projected.

Another form of electrical sensing circuit is shown in FIG. 8. This circuit 82 provides a control which is somewhat freer of undesirable A.C. current interference or variations than the sensing circuit 24 of FIG. 7 inasmuch as it utilizes a pair of diode rectifiers 84 and 85 and a center tap connection to the secondary coil 43 of the fan motor 17 whereby to provide full wave rectification of the current flow through the solenoid coil 37 rather than the half wave rectification of the sensing circuit 24 of FIG. 7. Inasmuch as the sensing circuit 82 of FIG. 8 is identical in part to the sensing circuit of FIG. 7, identical circuit components and terminals of the circuit 82 are identified by the same reference numerals used in identifying the corresponding circuit components and terminals in the circuit 24 of FIG. 7. However, it is noted that the terminal 35 of the photo-electric cell 30 is connected at 87 to like terminals of the two diode rectifiers 84 and 85 with the other terminals 88 and 89, respectively, of the restifiers 84 and 85 being connected to opposite ends of the secondary coil 43 of the fan motor 17. It is further noted that the terminal 44 of the resistance 45 is connected to the center-tap terminal 90 of the secondary coil 43.

In both the control circuits 24 and 82 of FIGS. 7 and 8, respectively, the circuit components enclosed within the broken lines may be compactly mounted on a plate-type chassis within the casing of the projector.

It is to be understood that the iris diaphragm 25 may be located in other positions in a lens housing or even outwardly thereof, for instance, as an attachment on the forward end of a lens housing. It is to be further understood that the solenoid coil 37 may be located at various locations within a projector casing depending upon the space available therefor and that, therefore, a modified form of linkage system may be utilized within the scope of the present invention.

It will be understood that certain changes may be made in the construction or arrangement of the projector control disclosed herein without departing from the spirit and scope of the invention as defined in the appended claims.

I claim:

1. In a projector for projecting transparencies on a screen wherein the projector includes a light source, a lens system, and transparency support means, control means for increasing and decreasing the projecting power of the projector when transparencies of greater and less density than a normal reference transparency density are being projected, said control means comprising, an iris diaphragm mounted in front of said support so that the latter is disposed between the light source and the iris diaphragm, said iris diaphragm being adapted to vary the cross-sectional area of the light beam transmitted by the projector to a screen thereby controlling the projecting power of the projector, a photo-electric cell mounted between said support means and said iris diaphragm for sensing variations in the density of different transparencies being projected, and electrically operated power means operably connected to said photo-electric cell and said iris diaphragm for automatically controlling the projecting power of the projector in response to variations in density sensed by the photo-electric cell.

2. The control means according to claim 1 wherein said iris diaphragm includes a plurality of pivotally mounted, generally crescent-shaped, leaf members interconnected by link members whereby upon pivoting movement of one of said leaf members all of the same are simultaneously pivoted either inwardly toward each other to decrease the cross-sectional area of the light beam or outwardly away from each other to increase the cross-sectional area of the light beam.

3. In a projector for projecting transparencies on a screen wherein the projector includes a light source, a lens system, and transparency support means, control means for increasing and decreasing the projecting power of the projector when transparencies of greater and less density than a normal reference transparency density are being projected, said control means comprising, an iris diaphragm mounted in front of said support means so that the latter is disposed between the light source and the iris diaphragm, said iris diaphragm being adapted to vary the cross-sectional area of the light beam transmitted by the projector to a screen thereby controlling the projecting power of the projector, said iris diaphragm including a plurality of pivotally mounted, generally members whereby upon pivoting movement of one of said leaf members all of the same are simultaneously pivoted either inwardly toward each other to decrease the cross-sectional area of the light beam or outwardly away from each other to increase the cross-sectional area of the light beam, light sensitive means mounted between said support means and said iris diaphragm for sensing variations in the density of different transparencies being projected, and a linkage system operably connected to said light sensitive means and to one of said leaf members for automatically increasing the cross-sectional area of the light beam and thereby the projecting power of the projector when a transparency denser than normal is being projected and for automatically decreasing the cross-sectional area of the light beam and thereby the projecting power of the projector when a transparency less dense than normal is being projected.

References Cited by the Examiner

UNITED STATES PATENTS

| | | | |
|---|---|---|---|
| 947,490 | 1/10 | Gwozdz | 352—198 |
| 1,934,484 | 11/33 | Camilli | 88—24 |
| 2,484,299 | 10/49 | Labrum | 88—24 |
| 2,968,214 | 1/61 | Kilminster | 88—24 |
| 3,114,283 | 12/63 | Gruner | 88—24 |

FOREIGN PATENTS 899,429  12/53  Germany.

JULIA E. COINER, *Primary Examiner.*

EMIL G. ANDERSON, *Examiner.*

UNITED STATES PATENT OFFICE
CERTIFICATE OF CORRECTION

Patent No. 3,198,065                                August 3, 1965

Henry A. Bohm

It is hereby certified that error appears in the above numbered patent requiring correction and that the said Letters Patent should read as corrected below.

Column 3, line 5, strike out "and"; column 5, lines 9 and 10, for "transmitted the lever" read -- transmitted to the lever 77 --; column 6, line 66, after "support" insert -- means --; column 7, line 27, for "members" read -- crescent-shaped, leaf members interconnected by link members --.

Signed and sealed this 3rd day of May 1966.

SEAL)

Attest:

ERNEST W. SWIDER                                   EDWARD J. BRENNER

Attesting Officer                                         Commissioner of Patents